Aug. 26, 1930.  H. HUEBER ET AL  1,774,376
MOTOR
Filed Oct. 14, 1925  4 Sheets-Sheet 1

Inventors
John R. Oishei
Henry Hueber
by Barton A. Bean
Atty

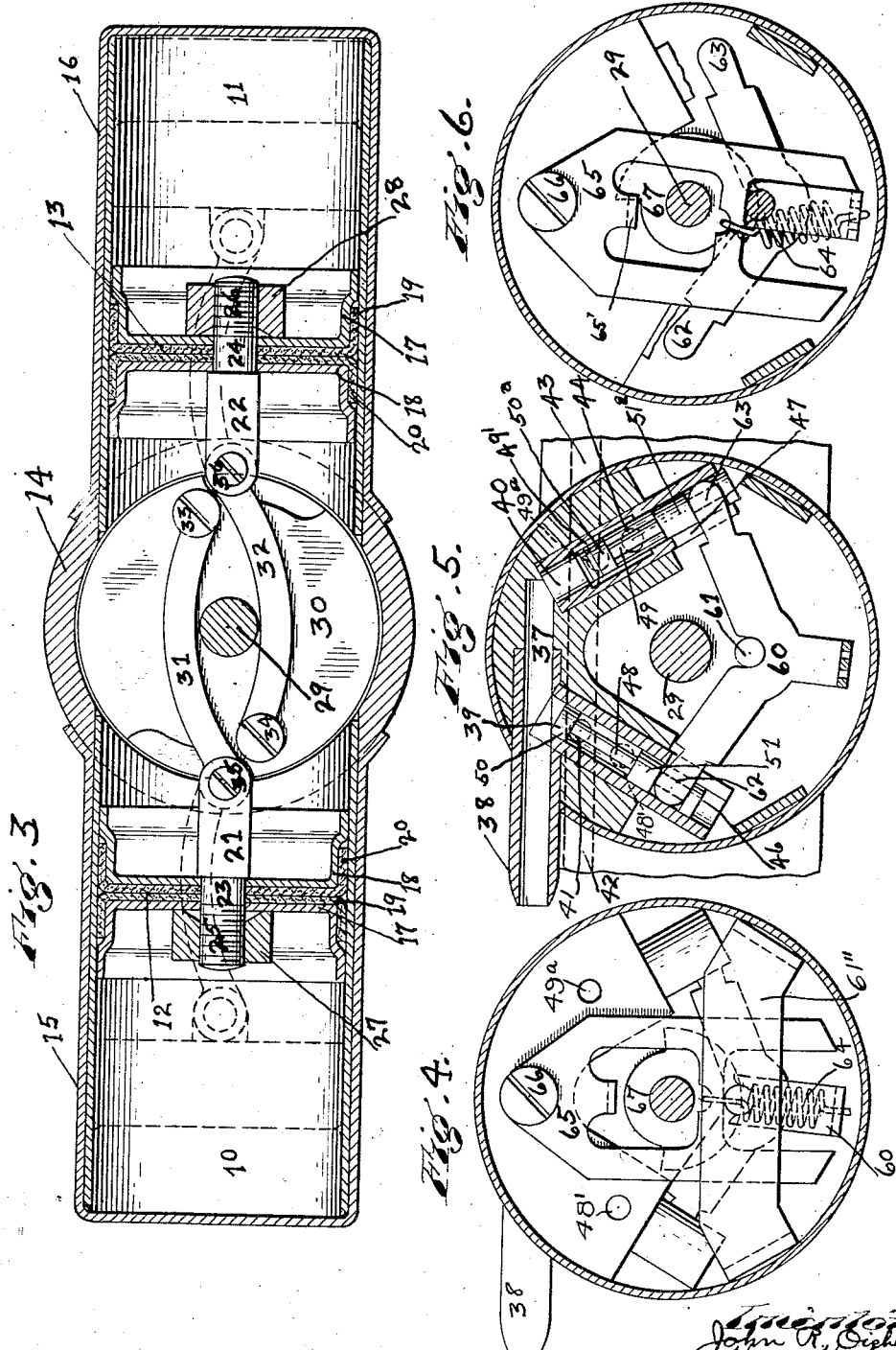

Aug. 26, 1930.  H. HUEBER ET AL  1,774,376
MOTOR
Filed Oct. 14, 1925   4 Sheets-Sheet 3
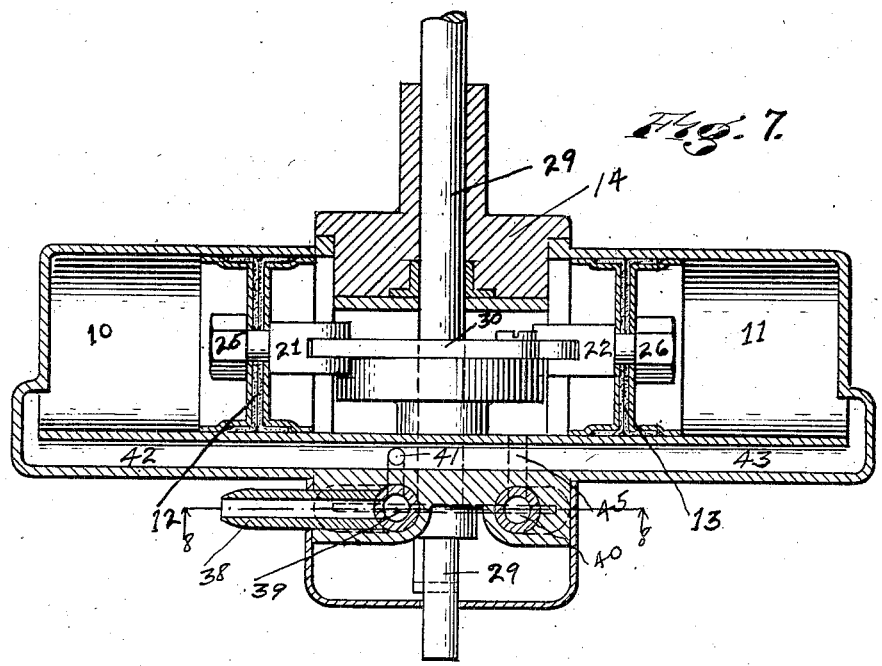
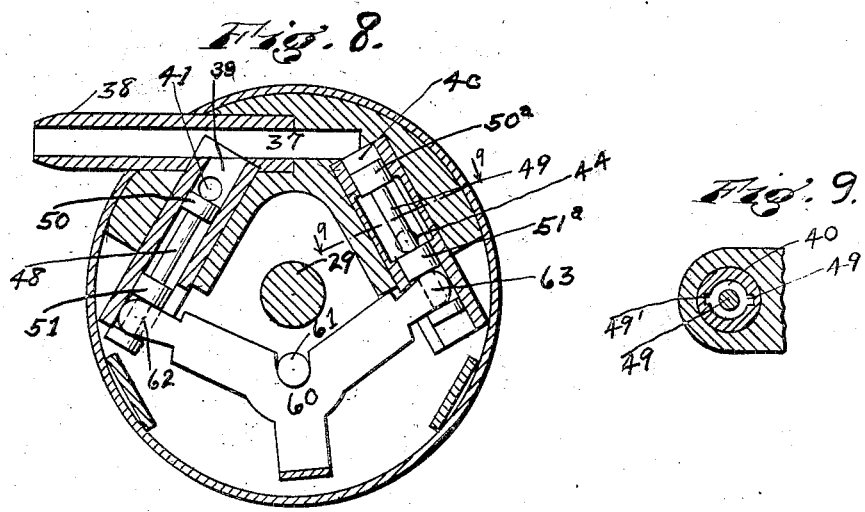

Aug. 26, 1930.  H. HUEBER ET AL  1,774,376
MOTOR
Filed Oct. 14, 1925   4 Sheets-Sheet 4

INVENTORS
John R. Oishei
Henry Hueber
by Barton A. Beard
Atty.

Patented Aug. 26, 1930

1,774,376

UNITED STATES PATENT OFFICE

HENRY HUEBER AND JOHN R. OISHEI, OF BUFFALO, NEW YORK, ASSIGNORS TO TRICO PRODUCTS CORPORATION, OF BUFFALO, NEW YORK

MOTOR

Application filed October 14, 1925. Serial No. 62,438.

This invention relates to fluid pressure operated accessory motors of the type adapted to be utilized in or on a motor vehicle for operating any desired accessory, such for example as a windshield cleaner or the like.

Heretofore in motors for this purpose having reciprocating pistons rigidly connected by a rack bar or equivalent means so as to move together, the rack bar engaged at one side of a pinion or operating member for a rock shaft which actuated the accessory to be operated. In such constructions the forces applied by the pistons to the rock shaft were always applied at one side only of the rock shaft or of the pinion which operates the shaft.

The objects of the present invention are to provide a motor of the type referred to which will operate upon a minimum of power in which the pistons are separately movable; also to provide a motor having a plurality of pistons which are movable simultaneously in opposite directions whereby the working forces of the pistons may be applied simultaneously to opposite sides of the rock shaft or of the rock shaft pinion; also to provide a motor of the type referred to in which the pistons are separate and are individually in engagement with the rock shaft or the actuating pinion or member for the rock shaft whereby the pistons may individually aline themselves in the respective cylinders; also to provide a motor of the type referred to which may be readily and inexpensively manufactured and assembled; and further to provide improvements in motors in the other respects hereinafter set forth and claimed.

In the accompanying drawings:

Fig. 3 is a section on line 3—3, Fig. 1 but on an enlarged scale.

Fig. 4 is a section on line 4—4, Fig. 2.

Fig. 5 is a section on line 5—5, Fig. 1.

Fig. 6 is a sectional elevation showing the valve operating mechanism.

Fig. 7 is a sectional elevation at right angles to the plane of section of Fig. 3, showing a modified construction.

Fig. 8 is a section on line 8—8, Fig. 7.

Fig. 9 is a section on line 9—9, Fig. 8.

Figure 1:
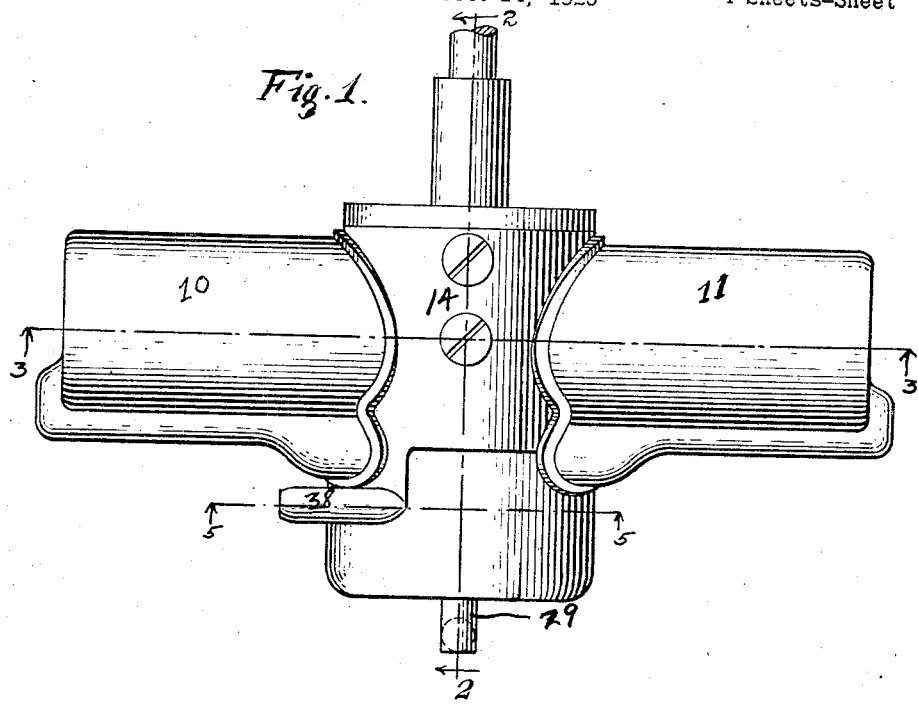
Fig. 1 is a plan view of a motor embodying the present invention.
Figure 2:
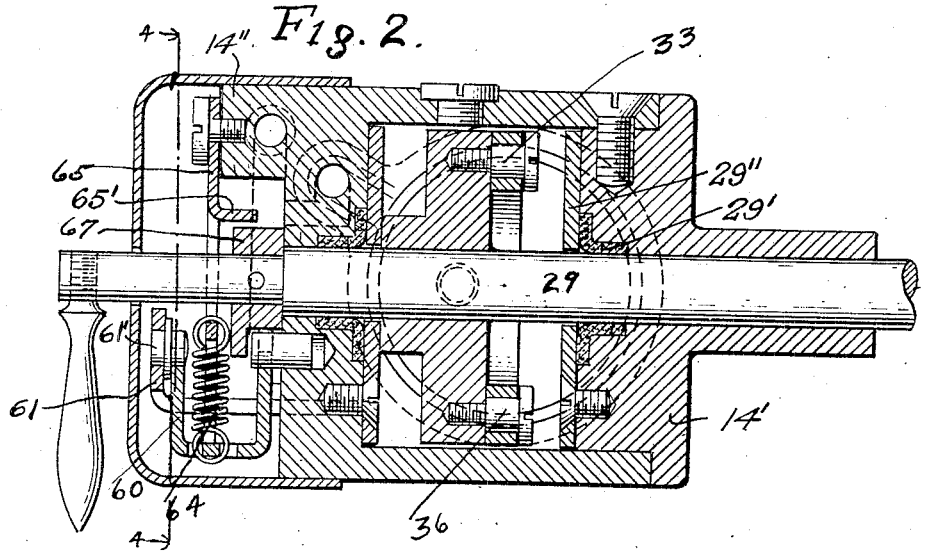
Fig. 2 is a section thereof on line 2—2, Fig. 1.

The present invention, generally speaking, contemplates the use of a plurality of pistons separately or individually engaging a rock shaft or the like or a member for operating a rock shaft so as to apply the operating forces on opposite sides of the pivotal axis of the shaft thereby tending toward the application of equalized or balanced power forces on the member to be operated. For this purpose, the motor illustrated in the drawings comprises a casing having a pair of cylinders 10 and 11 in which are positioned the pistons 12 and 13. The casing may consist, as shown, of a central body or casting 14 to which the cylinders 10 and 11 are attached, the outer ends of the cylinders being closed by separate shaped members 15 and 16 as in Fig. 3, or by an integral wall formation, as in Fig. 7.

As illustrated, each piston may be formed of a pair of cup shaped sustaining members 17 and 18 and may have secured between them a pair of oppositely facing flexible packing cups or members 19 and 20.

21 and 22 designate the piston shafts. As shown, these piston shafts may have reduced portions 23 and 24 which provide seats for the piston cups and for the flexible packing cups and the ends of the piston shafts may be threaded as indicated at 25 and 26 to cooperate with a pair of securing nuts 27 and 28 which hold the parts of the pistons and the flexible packing cups in position.

29 designates a rock shaft extending transversely of the motor and journaled in suitable bearings therein. This rock shaft is provided with rigid parts extending to opposite sides of the pivotal axis of the shaft. In the particular embodiment shown in the first figures of the drawing, a plate or disk 30 is rigidly connected to the rock shaft. 31 and 32 designate links which are pivotally secured as at 33 and 34 to substantially diametrically opposed points on the plate 30 having their other ends pivoted as at 35 and 36 to the piston rods. The casing is of simple construction and the central body portion 14 is also of a simple nature. This central body portion has a removable end closure 14' through which access may be gained to the central compartment of the motor. The opposed interior walls of the central compartment through which the shaft 29 extends are provided with packing recesses in which packing washers or members 29' are disposed, the same being retained in position by wall plates 29'' which constitute linings for said opposing walls of the central chamber.

The device here illustrated is adapted to be operated by fluid under pressure. In use on a motor vehicle this is preferably accomplished by connecting the device to a source of partial vacuum, as for example the intake manifold of the vehicle engine and at the same time admitting atmospheric air to portions of the device so as to move the pistons in the desired direction. Preferably the pistons are so positioned and related that atmospheric air may be admitted simultaneously at opposite ends of the casing and the central portion of the casing placed under the vacuum influence so that the pistons are caused to move by the pressure of the atmospheric air toward the center of the casing simultaneously. When the stroke is completed the opposite ends of the casing are then placed under the vacuum influence and atmospheric air is admitted to the center of the casing whereupon the pistons are caused to travel back toward the ends of the casing and the engagement of the piston rods at opposite sides of the rock shaft results in a balanced movement of the rock shaft under pressure from both of the oppositely moving pistons.

According to the invention, valves and valve actuating mechanism are provided so as to automatically reverse the movements of the pistons. With this operation in view, the motor is provided with a suction passage 37 communicating with a connector or nipple 38 on the casing, this nipple being adapted to be connected by a tube, conduit or the like to the intake manifold of the vehicle engine. The suction passage 37 communicates with a pair of valve ports 39 and 40, the valve port 39 being adapted to be placed in communication with the extreme opposite ends of the casing through a passage 41 and passages 42 and 43 and the valve port 40 being adapted to be placed in communication with the center portion of the casing through means of the passages 44 and 45 respectively. The valve ports or passages 39 and 40 are also adapted to be opened to the atmosphere. For this purpose, as shown they may be opened at the ends 46 and 47 to the atmosphere. 48 and 49 designate the valves which are movable in the valve ports or passages 39 and 40. Each of these valves is provided with a pair of heads 50 and 51 and $50^a$ and $51^a$ which control the admission or passage of atmospheric air and the suction or vacuum influence through the respective valve ports or passages. In the position of the valves shown in Fig. 5, atmospheric air is being admitted through the passage 41 of valve 48, the head 50 of this valve closing the passage 41 to the suction line 37. This atmospheric air passing through passage 41 enters the extreme ends of the casing through passage 41 and passages 42 and 43, thus subjecting the remote ends of the piston to atmospheric pressure. At the same time the suction or air exhaust line 37 is in communication with valve port 40 by reason of the fact that the head $50^a$ of its valve 49 is below the passage 44 of its valve chamber. This permits air to be exhausted from the center of the casing through the passage 45 and passage 44 and out through exhaust passage 37. In the position of the valves shown in Fig. 8, a reverse operation is taking place. In such position the passage 41 is uncovered to the air exhaust influence and therefore air is being withdrawn through passage 41 and passages 42 and 43 from the ends of the casing. At the same time the head 50 of the valve 48 prevents atmospheric air from getting into the exhaust line. In such position the head $50^a$ of the valve 49 is above the passage 44 and closes that valve chamber to the exhaust passage 37. Atmospheric air is entering the valve chamber and traveling through passages 44 and 45 to the center of the casing. As atmospheric air is being withdrawn from the ends of the casing and atmospheric air is being admitted to the center of the casing, the pistons will travel away from one another toward the ends of the casing.

Atmospheric air enters the valve chamber of valve 48 through a port 48' which is adapted to be separated from the suction port 41 by the valve head 50 when said suction port is in communication with the source of suction. Atmospheric air is admitted to the chamber of valve 49 through port $49^a$ which is adapted to be closed by the valve head $50^a$ when the suction passage 44 is opened to the source of suction about said head $50^a$ by means of the channels 49' formed in the wall of said valve chamber. These channels are closed when the valve head $50^a$ moves upwardly to uncover the atmospheric port $49^a$ so that the atmosphere entering the valve chamber beneath the head $50^a$ will enter between the pistons through the passages 44 and 45.

Figure 10:
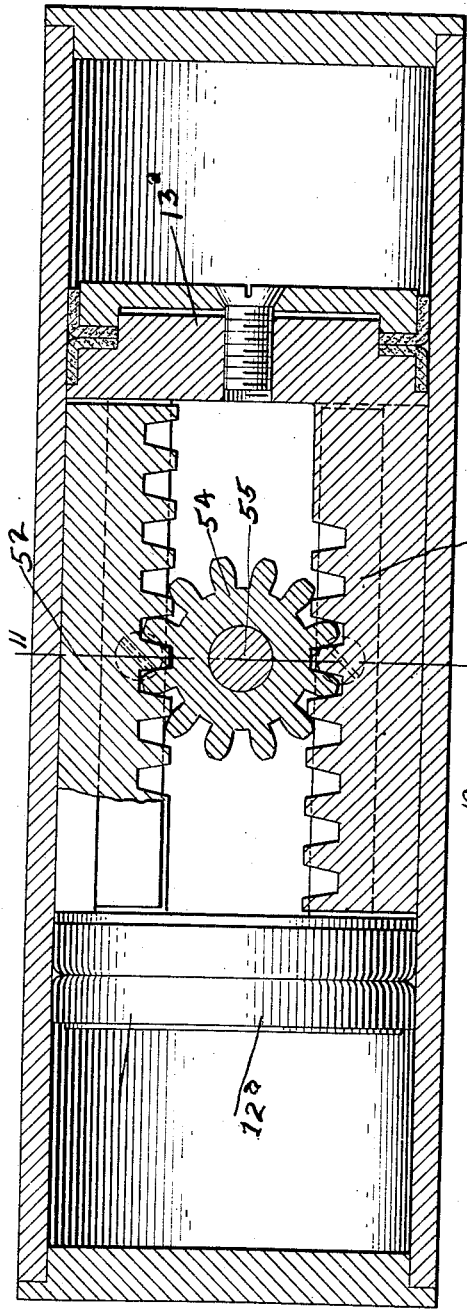
Fig. 10 is a sectional elevation on line 10—10 of Fig. 11 of a motor embodying a modified form of piston.
Figure 12:
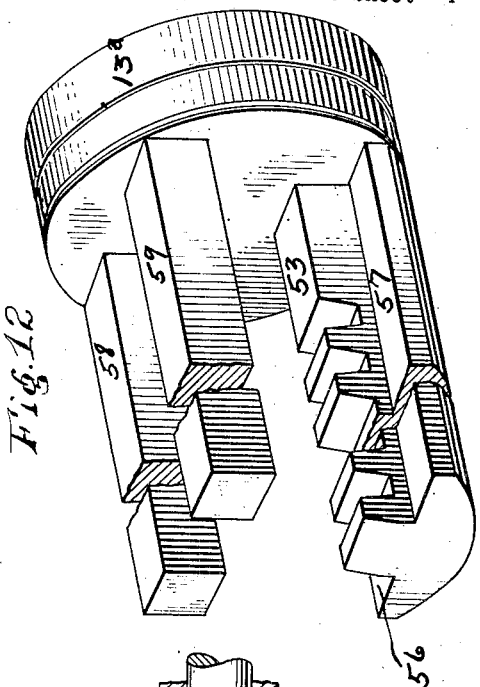
Fig. 12 is a perspective view of one of the modified forms of pistons.
Figure 11:
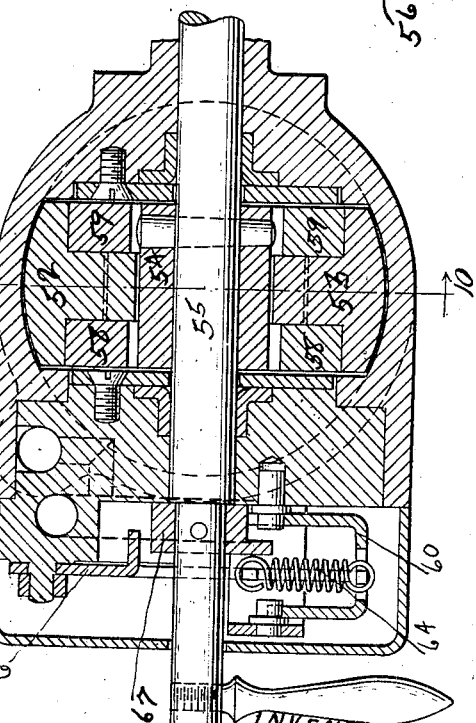
Fig. 11 is a section on line 11—11, Fig. 10.

In the form of device illustrated in Figs. 10, 11 and 12, the pistons $12^a$ and $13^a$ are provided with rack-like piston rods 52 and 53 which are adapted to engage opposite sides of a pinion 54 secured to the rock shaft 55 of the motor. The rack members 52 and 53 are provided with recessed or grooved portions as at 56 and 57, which are adapted to receive and guide the tongue or guide members 58 and 59 on the opposite piston. As these piston portions and rack members in this embodiment are identical, only one is fully illustrated. The valve actuating members in this form may be of the same form as hereinbefore described and therefore need no separate description.

The valves are so operated or connected as to admit atmospheric air to the extreme opposite ends of the casing when the central portion of the casing is under the vacuum influence and when the stroke of the pistons has been completed to reverse the operation by admitting atmospheric air to the central portion of the casing and subjecting the extreme opposite ends of the casing to the vacuum influence. For this purpose a valve actuating member 60 is provided this member being pivoted at a suitable point as on bearings 61 and 61' and having suitable portions as for example the portions 62 and 63 in engagement with the respective valves. The bearing 61' is mounted on a strap-like bracket 61'' in opposition to the bearing 61 whereby the spring hereinafter referred to may move back and forth to opposite sides of said bearings. The valve actuating member is preferably constructed and arranged so as to be quickly snapped or moved from one position to the other. For this purpose there is provided a spring 64 connected at one end to the valve actuating member and extending across or beyond the pivotal axis of the valve actuating member and secured to a rocker member 65 pivoted as at 66 to a part 14'' of the casing which overhangs the rock shaft 29. This rocker member is moved by a cam 67 on rock shaft 29 which engages a lug 65' of the valve rocker member 65 which lug is turned inwardly beneath the overhanging part 14'' so as to extend into the path of the cam 67. This results in the rocker member being shifted by the cam on the rock shaft when the rock shaft has moved a predetermined distance in a given direction thus shifting the upper end of the spring. When the upper end has been shifted a sufficient distance so that the spring lies to one side of the pivot point of the valve actuating member that member is quickly moved, shifting the valves. The two valves are disposed on the opposite sides of the shaft 29 and converge upwardly over the shaft. The valve actuator 60 is pivoted below the shaft and extends outwardly to engage with the diverging lower ends of the valve. This arrangement defines a space about the shaft in which the cam 67 is disposed, and tends toward compact arrangement of the valve actuating mechanism.

We claim as our invention:

1. In a fluid pressure actuated accessory motor, a casing having spaced inlet and exhaust openings, a piston operable in the casing, a rock shaft journaled in the casing and operable by the piston, and valve mechanism for operatively admitting fluid pressure to the casing, comprising spaced valves for said inlet and exhaust openings, a pivoted valve actuator for controlling the valves, a rocker member pivoted on the opposite side of said shaft from the pivotal mounting of the actuator and having an opening through which the shaft freely extends, said shaft defining the extent of movement of said rocker member, means on the shaft for rocking said rocker member, and spring means connecting the rocker member to the valve actuator and movable by the rocker member to opposite sides of the pivotal mounting of said actuator whereby to snap the latter back and forth on its pivot.

2. In a fluid pressure actuated accessory motor, a casing having spaced inlet and exhaust openings, a piston operable in the casing, a rock shaft journalled in the casing and operable by the piston, and valve mechanism for operatively admitting fluid pressure to the casing, comprising spaced valves for said inlet and exhaust openings, a pivoted valve actuator for controlling the valves, a rocker member pivoted on the opposite side of said shaft from the pivotal mounting of the actuator and having an opening through which the shaft freely extends, said rocker member being stamped from sheet metal and having a lug turned to one side thereof lengthwise of the shaft, a cam fixed on the shaft to rock therewith, the lug of said rocker member extending into the path of said cam to be engaged thereby for rocking said rocker member, and resilient means connecting the actuator to an adjacent part of said rocker member and movable by the latter to opposite sides of the pivotal mounting of said actuator whereby said resilient means will snap the actuator back and forth.

3. In a fluid pressure motor, a casing, a piston therein, a rock shaft journaled in the casing and operable by said piston, said casing having inlet and outlet openings, said casing having a part overhanging the shaft, and valve means for operatively admitting fluid pressure through said casing openings, said valve means including a rocker member pivoted on said casing part and having an opening through which the shaft freely extends, a movable valve actuator, a spring connecting the actuator to the rocker member for snapping the actuator back and forth, and a cam on the shaft beneath the casing part, said rocker member having a lug underlying said casing part and engageable by said cam to be moved thereby for rocking said rocker member.

4. In a fluid pressure actuated motor, a casing having spaced inlet and exhaust openings, a piston in the casing, a rock shaft operable by the piston, valve mechanism for operatively admitting fluid pressure to the casing, comprising spaced valves for said inlet and exhaust openings, a pivoted valve actuator for controlling the valves, a rocker member pivoted on the opposite side of said shaft from the pivotal mounting of the actuator and having an opening through which the shaft freely extends, said rocker member having a lug extending laterally thereof at said opposite side of the shaft and lengthwise of the shaft, means on the shaft for engaging said lug to rock said member, and spring means arranged at the side of the shaft at which the actuator is pivoted and connecting the rocker member to the valve actuator, said spring means movable by the rocker member to opposite sides of the pivotal mounting of said actuator for snapping the latter back and forth on its pivot.

HENRY HUEBER.
JOHN R. OISHEI.